Dec. 21, 1937.  W. E. SHERWOOD  2,103,023
ODOMETER RESET
Filed Dec. 13, 1934
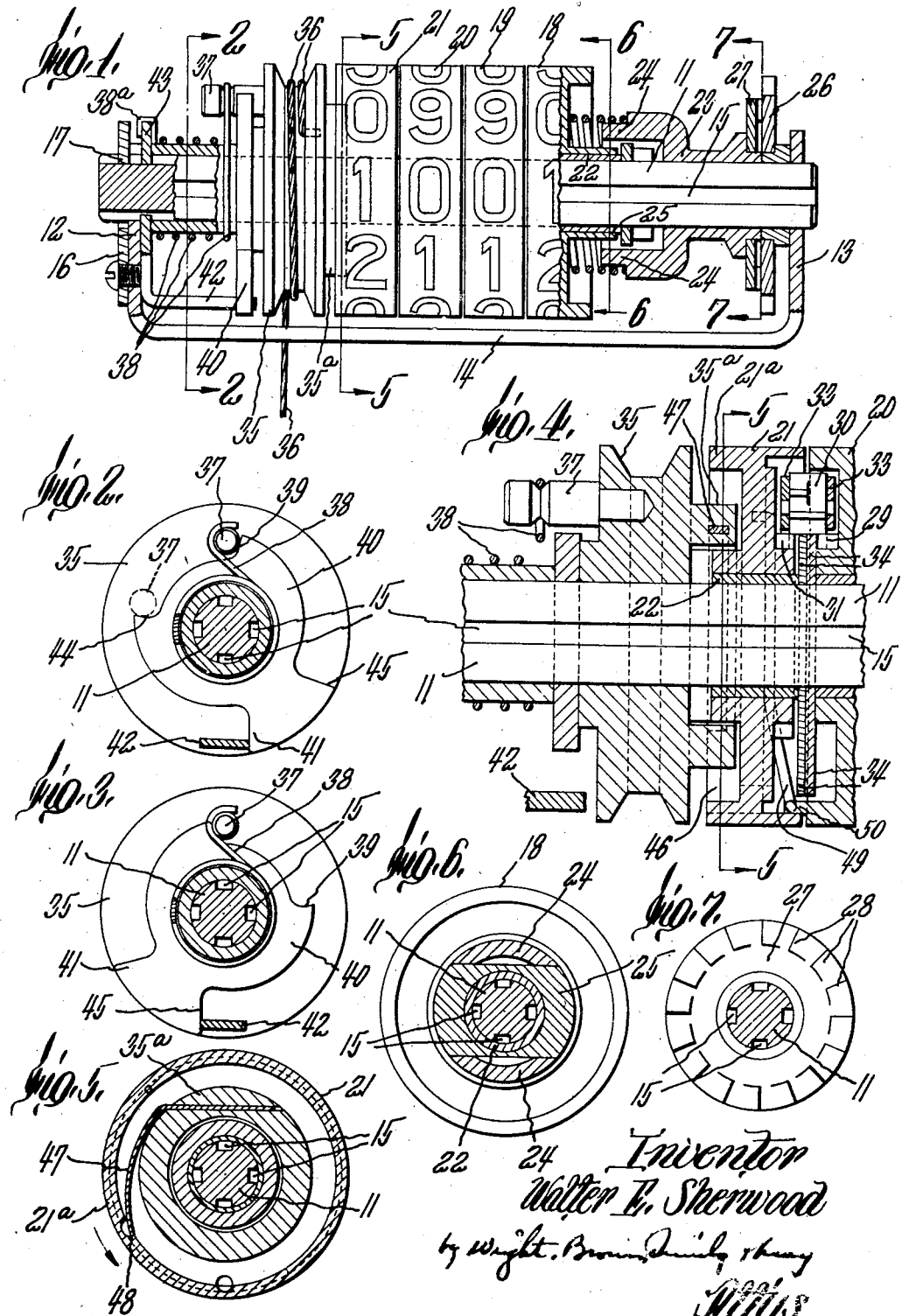
Inventor
Walter E. Sherwood Patented Dec. 21, 1937

2,103,023

UNITED STATES PATENT OFFICE 2,103,023

ODOMETER RESET

Walter E. Sherwood, Pepperell, Mass., assignor to Waltham Watch Company, Waltham, Mass., a corporation of Massachusetts Application December 13, 1934, Serial No. 757,352

4 Claims. (Cl. 235—144)

The present invention relates to instruments for counting or totalizing numerical values by means of number bearing disks or the like, such as the trip odometers used in automobiles, and has for its object to provide a simple and efficient means for quickly setting such disks in their zero indicating positions after displacement therefrom. A related object is to enable an operator to effect this action by a single quick movement of his hand, and to insure arrest of the disks in the prescribed position accurately and automatically. The invention comprises a pulley or the like adapted to be rotated by pulling upon a cord or equivalent tension member secured to the pulley and wrapped around its circumference, automatic means for normally holding the pulley in a given position and arresting it after rotation through a given angle by the cord, and means for transmitting such rotation from the pulley to the highest order number disk of the odometer in the same direction that the disks are normally rotated in counting. It comprises further the combination of such resetting member with the counting disks or wheels of an odometer and a driver for the lowest order disk of the odometer constructed and organized to permit independent movement of such disk in the same direction. It further comprises all substantial equivalents of the parts and combinations mentioned in the foregoing summarized description, and more particularly described in the following specification, within the scope of the appended claims as interpreted with reference to the prior art.

In the drawing,—

Fig. 1 is an elevation partly broken away and shown in section, on an enlarged scale, of the working parts of an odometer device and resetting means embodying this invention;

Fig. 2 is a cross section taken on line 2—2 of Fig. 1 and an end elevation of the parts at the right of said line;

Fig. 3 is a view similar to Fig. 2 but showing a different position of the parts represented therein;

Fig. 4 is an enlarged axial section of the resetting pulley and parts immediately adjacent thereto;

Fig. 5 is a cross section on line 5—5 of Figs. 1 and 4;

Figs. 6 and 7 are cross sections on lines 6—6 and 7—7 respectively of Fig. 1.

Like reference characters designate the same parts wherever they occur in all the figures.

All the rotating parts of the instrument are supported on a shaft 11, the ends of which are mounted in holes or sockets in the upturned end portions or legs 12, 13 of a bar 14. This bar is in effect a frame supporting the odometer and is adapted to be secured in the casing of a speedometer-odometer instrument, or other counter.

Shaft 11 is made with a number of longitudinal grooves or keyways 15 in its sides. A plate 16 is secured to the leg 12 of the frame and formed with a hole through which the end of the shaft passes, and with a key 17 projecting inward from the rim of the hole which enters one of the keyways to prevent rotation of the shaft. Four (more or less) number bearing counting disks or wheels 18, 19, 20 and 21 are mounted side by side, rotatably, on the shaft, having bushing sleeves 22 which directly engage the shaft. The lowest order disk 18 is driven by a sleeve 23 rotatable on the shaft 11 having clutch jaws 24 which embrace the flattened hub 25 of this disk, as best shown in Fig. 6. The sleeve in turn is driven by a gear 26 independently rotatable on the shaft, and a ratchet disk 27 tightly secured on the sleeve. Said disk, as shown in Fig. 7, has inclined ratchet or clutch teeth 28 on its face next to the gear which, when interengaged with projections on the contiguous face of the gear, transmit rotation in one direction. But they permit rotation of the disk ahead of the gear in the same direction. This gear is adapted to be connected through any suitable transmission means with the driving mechanism or wheels of an automobile in which the odometer is mounted, or with a moving part of any other machine of which the operations are to be counted.

Intermittent fractional rotation is transmitted from each disk of lower order to the next disk of higher order by a mutilated pinion 29 on the lefthand hub of the lower order disk (see Fig. 4), which in this instance has two teeth, an intermediate carrying pinion 30, and a complete gear 31 on the right hand hub of the higher order disk. Although Fig. 4 shows only the carry mechanism between the two disks 20 and 21 at the lefthand end of the counter, the same mechanism is provided between each two of the other disks, and this description suffices for all. The intermediate pinions are pivoted between bridge members 33 carried by disks 34 which are slipped over the shaft and keyed into one of the grooves 15 thereof. This mechanism and the details thereof are substantially the same as the corresponding parts shown in the patent to George W. Toney, 1,493,087, May 6, 1924, to which reference is directed for further illustration. Rotation of each carry pinion 30 is yieldingly resisted by a spring (not shown here but essentially like the spring provided for the same purpose shown in said Toney patent) which insures that the intermittent rotation will be transmitted only at the required times and to the required extent, but permits independent rotation of the pinion, and its driven rotation by, the higher order disk. In other words, the carry pinion is not positively locked against rotation by the higher order disk.

For setting the disks at zero, a pulley 35 is mounted rotatably on the shaft beside the highest order disk. A cord 36 is secured at one end of the pulley and wrapped around its circumference through at least one complete turn to insure a full rotation of the pulley when the cord is pulled outward. This cord extends to the exterior of the instrument case where it can be grasped by an operator. A pin 37 protrudes from the outer side of the pulley and is pressed upon by a spring 38 wihch normally holds it against a shoulder 39 on a freely rotatable disk 40, mounted on the shaft, and holds a second shoulder 41 of said disk against a stationary stop 42, which is located clear of the path in which pin 37 rotates. Said stop is made as an arm projecting from a plate 43 which surrounds the shaft and is keyed to it. Spring 38, which is coiled around a sleeve on the shaft, is also held by the plate 43, being anchored thereto by its end 38a, as shown in Fig. 1.

By means of the spring and the coaction of stop 42 and stop shoulders 39 and 41 on disk 40, the pulley is normally held in a definite position, which is that shown in Figs. 1 and 2, and returned to that position when released after having been displaced. When the pulley is turned by pulling the cord, it is arrested in another definite position (which in this instance is at the end of one complete rotation) by other shoulders 44 and 45 on the disk, cooperating with the stop, as shown in Fig. 3. After a partial rotation of the pulley, the pin 37 reaches shoulder 44, as shown by broken lines in Fig. 2; and then disk 40 is carried with the pulley until shoulder 45 comes to bear on the opposite side of the stop from that previously engaged by shoulder 41. The angle between shoulders 39 and 44 and the angle between shoulders 41 and 45 are established with reference to the diameter of pin 37 and the width of stop 42 so as to insure arrest of the pin at the end of exactly 360° of rotation.

The hub 35a of pulley 35 extends into an annular cavity 46 in the adjacent side of number disk 21, and carries, securely embedded within its substance, one end of a leaf spring 47, the other end of which bears, and is pressed resiliently against, the rim 21a of the number disk. The free part of the spring extends from its anchorage in generally the same direction as the rotation of the contiguous part of the number disk. The rim of the latter contains an abutment 48 arranged to slip by the end of the spring in the normal counting movement, and to interlock rigidly with the spring when the latter is propelled by the pulley in the same direction. Consequently, when the cord is pulled, the spring, when it reaches the abutment 48, carries the adjacent number disk along with the pulley.

Substantially similar means are provided to transmit this motion to the number disks of lower order. Each number disk, except the one of lowest order, carries at its right hand side a spring 49 to cooperate with an abutment 50 on the adjacent side of the disk next to the right. This spring is embedded at one end in the central web of the number disk and lies close within the right hand rim portion thereof, so as to clear the intermediate carrying pinion, and its free end is inclined outwardly toward the edge of the disk. The abutment on the disk of lower order overlaps the inner surface of the higher order disk in the path of the end of spring 49 and is shaped according to the principles of a ratchet tooth so as to slip past the spring when propelled in the normal manner for counting, and to abut squarely against the end of the spring when the higher order disk is driven from the resetting pulley.

A single rotation of the pulley suffices to bring all of the disks to their zero indicating position from any position in which they may be when this action is performed; and when the lowest order disk is thus moved, it carries the clutch sleeve 23 and one way clutch disk 27 with it ahead of the driving gear 26. The intermediate carry pinions 30 are then rotated by the gear elements 31 with which they are respectively in mesh, being permitted thus to rotate by yielding of their spring detents, previously mentioned.

What I claim and desire to secure by Letters Patent is:—

1. The combination with a counting element, of a spring retracted setting element for imparting rotation to said counting element in one direction only, manual means for turning said setting element in the direction opposite to its spring retracted movement, a stop abutment carried by said setting element, a stationary stop abutment, and an intermediate stop member movable relatively to each of said abutments and having shoulders complemental to each of said abutments.

2. The combination with a counting element, of a spring retracted setting element for imparting rotation to said counting element in one direction only, manual means for turning said setting element in the direction opposite to its spring retracted movement, a stop abutment carried by said setting element, a stationary stop abutment, and an intermediate stop member movable relatively to each of said abutments and having two pairs of stop shoulders; the shoulders of one pair being arranged to coact alternately with the movable abutment, and those of the other pair to coact alternately with the fixed abutment.

3. The combination with a rotatably mounted member having a stop abutment, of a stationary abutment out of the path of the before mentioned movable abutment, and an intermediate movable member having spaced apart shoulders cooperating with the fixed abutment to limit movement in opposite directions relatively thereto, and other spaced apart shoulders in position to engage the movable abutment and limit rotation of said abutment and intermediate member relatively to one another.

4. The combination with a supporting structure, of a fixed stop mounted thereon, a rotatable member supported rotatably by said structure having spaced apart shoulders in position to engage said stop alternately with rotation of said member in one direction or the other, and a second rotatable member mounted on the supporting structure having a stop element located clear of interference with the fixed stop; the first named rotatable member having spaced apart shoulders in position to be engaged alternately by the last named stop element with rotation of the second named rotatable member in opposite directions.

WALTER E. SHERWOOD.